April 27, 1954   F. W. LIMBERGER   2,676,448
GRASS TRIMMER
Filed Sept. 11, 1950   2 Sheets-Sheet 1
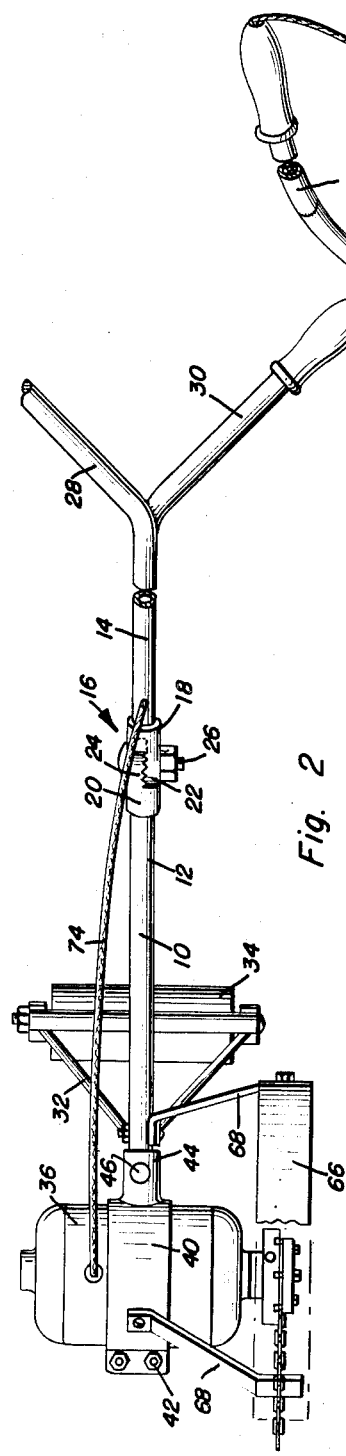
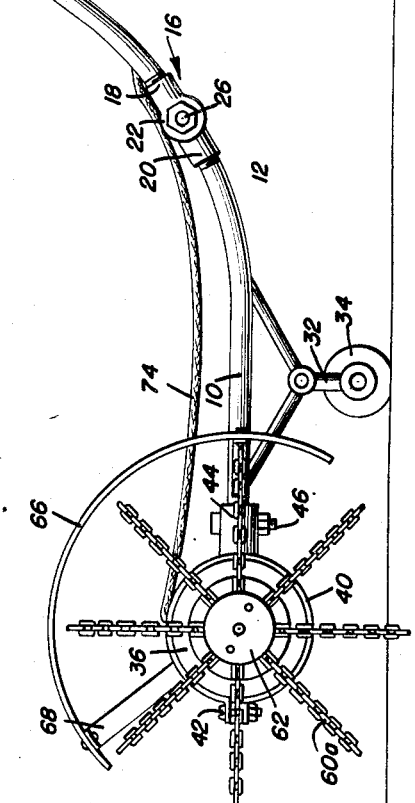
Inventor
Frank W. Limberger
By *Clarence A. O'Brien and Harvey B. Jacobson*
Attorneys April 27, 1954  F. W. LIMBERGER  2,676,448
GRASS TRIMMER
Filed Sept. 11, 1950  2 Sheets—Sheet 2

Frank W. Limberger
Inventor

By Clarence A. O'Brien
and Harvey B. Jacobson
Attorneys

Patented Apr. 27, 1954

2,676,448

UNITED STATES PATENT OFFICE 2,676,448

GRASS TRIMMER

Frank W. Limberger, San Antonio, Tex.

Application September 11, 1950, Serial No. 184,306

7 Claims. (Cl. 56—25.4)

This invention relates to new and useful improvements in grass trimming devices and the primary object of the present invention is to provide a device for trimming all types of lawn around sidewalks, curbs and flower beds, and including a rotary member supporting a plurality of cutter chains that will effectively cut grass or the like.

Another important object of the present invention is the utilization of lengths of chains as a cutting means and which chains will have a flailing action on grass, tending to sweep the ground or cement clear when brought into contact without injury to the chains or any solid object.

A further object of the present invention is to provide an electric grass trimmer including a flywheel to which the chains are attached and a motor having a drive shaft supporting the flywheel and so mounted upon a support to permit retention of the motor shaft vertically or horizontally and thereby permitting the chains to be used along either edge of a walk or for cutting weeds or high grass.

A still further aim of the present invention is to provide an electric grass trimmer that is extremely light in weight for convenient manipulation and which is strong and reliable and highly efficient in operation.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention;

Figure 2 is a plan view of Figure 1 and with part of the shield broken away;

Figure 3:
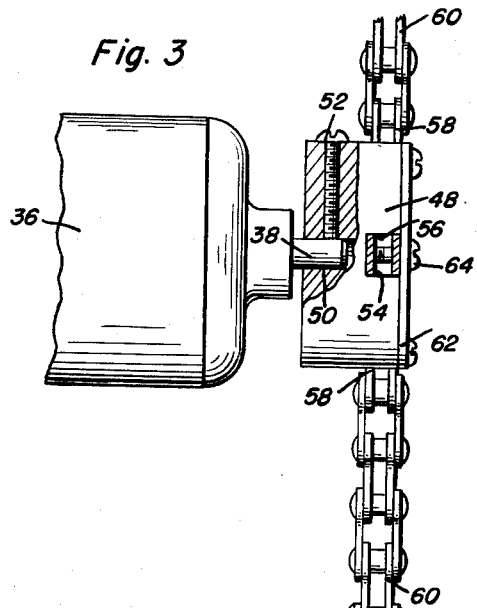
Figure 3 is an enlarged elevational view of the motor showing the flywheel attached thereon and supporting the cutter chains.
Figure 6:
Figure 6 is a transverse sectional view taken substantially on the plane of section line 6—6 of Figure 5.
Figure 5:
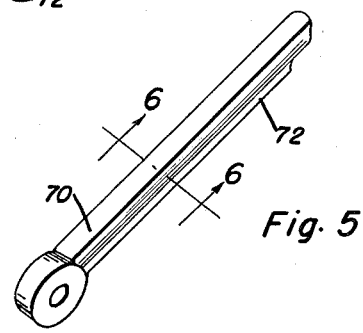
Figure 5 is a perspective view of one of the cutter blades that is used in the invention.

Referring now to the drawings in detail, wherein for the purpose of illustration there is disclosed a preferred embodiment of the present invention, the numeral 10 represents an elongated tubular horizontal support having an upwardly curved rear end portion 12 that is connected to one end of a handle 14 through the medium of a coupling 16. The coupling 16 is composed of upper and lower internally threaded sleeves 18 and 20 that are integrally formed with ears 22 and 24 having inner clutch or serrated faces. The ears 22 and 24 are joined by a bolt and nut 26 whereby the handle 14 may be retained in a selected vertically inclined position.

The upper end portion of the handle 14 is bent laterally to provide a hand gripping portion 28 and an arm 30 is fixed by welding or the like to the inner end of the portion 28 and constitutes another hand gripping portion.

A roller mount 32 is secured to and depends from the support 10 and rotatably supports a horizontal roller 34 that is disposed transversely of and beneath the support 10. The roller 34 is sufficiently long to provide a highly satisfactory bearing surface for the trimming device.

An electric motor 36 is mounted on the support and includes a drive shaft 38. A mounting band 40 embraces the motor and the ends of the band 40 are adjustably connected together by fasteners 42 to clampingly retain the band about the motor. A socket member 44 is fixed to and projects horizontally and rearwardly from the band 40 to receive the forward end of the support 10. The forward end of the support 10 is preferably threaded in the socket member 44.

The forward end of the support 10 is provided with a vertical opening and a horizontal opening that will selectively register with a transverse opening in the socket member and a bolt 46 having a nut thereon is extended through the opening in the socket member and either the vertical or horizontal opening in the forward end of the support 10 to retain the drive shaft 38 horizontally at either side of the support or vertical.

A flywheel 48 is rotatable with the drive shaft 38. The flywheel 48 is provided with a central bore 50 that receives the drive shaft 38 and a set screw 52 carried by the flywheel bears against the shaft 38 to hold the flywheel on the shaft. The outer face of the flywheel is formed with a plurality of circumferentially spaced radial slots 56 that receive the inner ends 58 of cutter chains 60.

The slots 56 are closed by a cover or closure plate 62 that is secured to the flywheel by a plurality of fasteners 64 and the fasteners 64 also extend through the inner ends of the chains 60.

Figure 4:
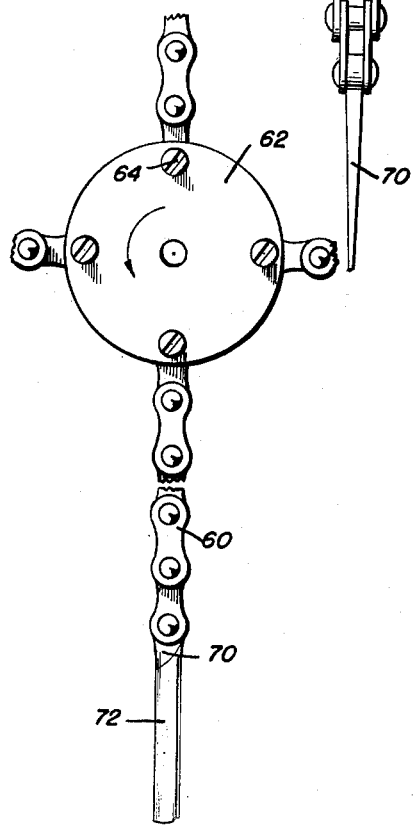
Figure 4 is a front view of Figure 3, the motor removed.
Figure 7:
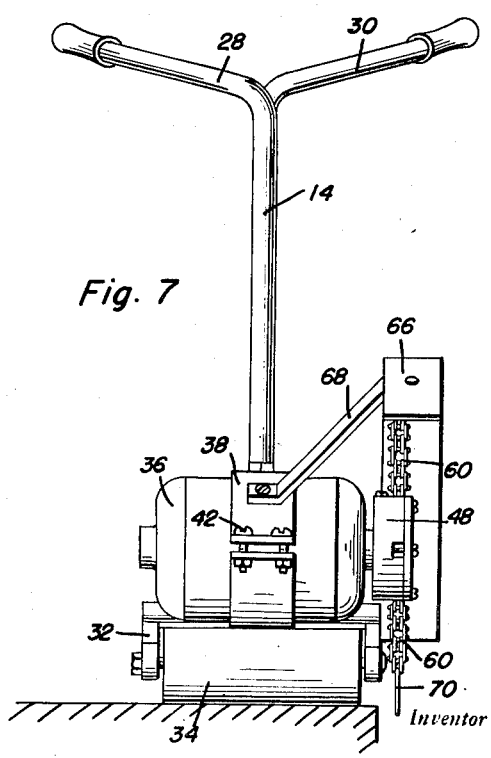
Figure 7 is a front elevational view of Figure 2.

An arcuate shield 66 overlies the chains 60 and is secured to the band 40 and the support 10 through the medium of arms 68. Any suitable number of chains 60 may be employed and when link chains 60a, of the type shown in Figures 1 and 2, are employed, it has been found that eight will properly cut the grass. When sprocket chains 60, of the type shown in Figures 3, 4, and 7 are used, only four are required. However, elongated hardened steel cutter blades 70 are secured to the outer ends of the chains and include longitudinally extending leading beveled edges 72.

An electric cord 74 extends from the motor 36, through an opening in the lower end of the handle 14 upwardly through the handle 14, the hand gripping portion 30 and then to a source of electric current. The cord 74 supports a switch 76 that is conveniently located with respect to the portion 30.

Although the motor 36 described and shown is of the electric type, obviously a gas engine prime mover may be employed for rotating the cutter chains.

Having described the invention, what is claimed as new is:

1. A lawn edge trimmer comprising an elongated tubular support, an elongated roller depending from and disposed transversely of and under the forward portion of the support, a motor having a drive shaft, a band embracing the motor, a socket member fixed to and projecting rearward from the band and rotatable axially on the forward end of said support in advance of the roller to position the drive shaft at either side of the support with the drive shaft disposed horizontal or to permit the drive shaft to be disposed vertically, a flywheel attached to said drive shaft, and a plurality of cutter chains attached to said flywheel and extending radially from the flywheel upon rotation of the flywheel.

2. A portable lawn edge trimmer comprising an elongated wheeled support, a motor mounted on the forward end of said support and including a horizontally disposed drive shaft, a flywheel mounted on said drive shaft for rotation therewith, and a plurality of equal length chains having inner ends secured to said flywheel, the inner ends of said chains being spaced circumferentially about said flywheel, said flywheel having a plurality of circumferentially spaced radial notches in its wall, said notches receiving the inner ends of said chains, and a closure plate secured to the flywheel and closing the notches and retaining the inner ends of said chains in said notches.

3. The combination of claim 1 and a shield mounted on said support and overlying said chain and spaced from said shaft a distance greater than the lengths of said chains.

4. A lawn edge trimmer comprising an elongated tubular support, a roller carried by and depending from the support and disposed transversely under the forward portion of the support, an electric motor having a drive shaft, a mounting band embracing and clamped about the motor, a socket member fixed to and projecting radially outwardly from the band and rotatably supported on the forward end of said support, means carried by the socket member and engaging the support for retaining the socket member in a selected rotated position on said support for selectively positioning the drive shaft of the motor vertically and horizontally, a flywheel mounted on the drive shaft of the motor for rotation therewith, and a plurality of equal length chains having inner ends attached to said flywheel.

5. A lawn edge trimmer comprising an elongated tubular support, a roller carried by and depending from the support and disposed transversely under the forward portion of the support, an electric motor having a drive shaft, a mounting band embracing and clamped about the motor, a socket member projecting radially outwardly from the band and rotatably supported on the forward end of said support in advance of the roller, means carried by the socket member engaging the support for retaining the socket member in a selected rotated position on said support for selectively positioning the drive shaft of the motor vertically and horizontally, a flywheel mounted on the drive shaft of the motor for rotation therewith, a plurality of chains having inner ends attached to said flywheel, a tubular handle, said support having an upwardly curved end portion, means coupling the upwardly curved end portion of said support to one end of said handle, and an electric cord attached to said motor and extending through the handle, said handle having openings adjacent each end receiving said cord.

6. A portable lawn edge trimmer comprising an elongated tubular support, a roller carried by and depending from the support and extending transversely under the forward portion of the support, an electric motor having a drive shaft, a mounting band embracing and clamped about the motor, a socket member projecting radially outwardly from the band and rotatably supported on the forward end of said support in advance of the roller, means carried by the socket member engaging the support for retaining the socket member in a selected rotated position on said support for selectively positioning the drive shaft of the motor vertically and horizontally, a flywheel mounted on the drive shaft of the motor for rotation therewith, a plurality of chains having inner ends attached to said flywheel, said chains having outer ends, and an elongated cutter blade attached to the outer end of each of said blades.

7. The combination of claim 4 wherein said flywheel includes a plurality of circumferentially spaced radial slots and receiving the inner ends of said chains, a closure plate covering the slots, and fasteners securing the plate to the flywheel and also securing the inner ends of said chains to the flywheel and within the slots.

References Cited in the file of this patent

UNITED STATES PATENTS

| Number | Name | Date |
| --- | --- | --- |
| Re. 21,274 | Orr | Nov. 21, 1939 |
| 1,550,102 | Schlueter | Aug. 18, 1925 |
| 1,744,597 | Vasconcelles | Jan. 21, 1930 |
| 1,871,606 | Haddad | Aug. 16, 1932 |
| 2,341,486 | Swertfeger | Feb. 8, 1944 |
| 2,410,196 | Benthall, Sr. | Oct. 29, 1946 |
| 2,478,813 | Esleck | Aug. 9, 1949 |
| 2,531,732 | Hoffman | Nov. 28, 1950 |
| 2,538,230 | Boggs | Jan. 16, 1951 |